US008577856B2

(12) United States Patent
Mizrahi

(10) Patent No.: US 8,577,856 B2
(45) Date of Patent: Nov. 5, 2013

(54) SYSTEM AND METHOD FOR ENABLING SEARCH OF CONTENT

(76) Inventor: Aharon Mizrahi, Tenafly, NJ (US)

( * ) Notice: Subject to any disclaimer, the term of this patent is extended or adjusted under 35 U.S.C. 154(b) by 331 days.

(21) Appl. No.: 12/246,311

(22) Filed: Oct. 6, 2008

(65) Prior Publication Data

US 2009/0106202 A1 Apr. 23, 2009

Related U.S. Application Data

(60) Provisional application No. 60/977,704, filed on Oct. 5, 2007.

(51) Int. Cl.
G06F 17/30 (2006.01)
G06F 7/00 (2006.01)

(52) U.S. Cl.
USPC ............ 707/705; 707/706; 707/707; 706/20; 706/21; 706/22; 706/23

(58) Field of Classification Search
None
See application file for complete search history.

(56) References Cited

U.S. PATENT DOCUMENTS

| | | | | |
|---|---|---|---|---|
| 6,505,160 | B1* | 1/2003 | Levy et al. .................... | 704/270 |
| 6,947,959 | B1* | 9/2005 | Gill .............................. | 715/202 |
| 7,162,691 | B1* | 1/2007 | Chatterjee et al. ........... | 715/205 |
| 2002/0090934 | A1* | 7/2002 | Mitchelmore ................ | 455/412 |
| 2003/0174861 | A1* | 9/2003 | Levy et al. .................... | 382/100 |
| 2004/0064568 | A1* | 4/2004 | Arora et al. .................. | 709/228 |
| 2004/0064693 | A1* | 4/2004 | Pabla et al. ................... | 713/168 |
| 2004/0220926 | A1 | 11/2004 | Lamkin et al. | |
| 2004/0267815 | A1* | 12/2004 | De Mes ....................... | 707/104.1 |
| 2005/0086689 | A1 | 4/2005 | Dudkiewicz et al. | |
| 2005/0091268 | A1* | 4/2005 | Meyer et al. ................. | 707/103 R |
| 2005/0097618 | A1 | 5/2005 | Arling et al. | |
| 2005/0138198 | A1 | 6/2005 | May | |
| 2005/0190273 | A1* | 9/2005 | Toyama et al. ............... | 348/231.5 |
| 2005/0240558 | A1 | 10/2005 | Gil et al. | |
| 2006/0107297 | A1* | 5/2006 | Toyama et al. ............... | 725/105 |
| 2006/0242139 | A1 | 10/2006 | Butterfield et al. | |
| 2006/0294086 | A1* | 12/2006 | Rose et al. .................... | 707/3 |
| 2006/0294134 | A1* | 12/2006 | Berkhim et al. ............. | 707/102 |
| 2007/0005653 | A1* | 1/2007 | Marsh .......................... | 707/104.1 |
| 2007/0027931 | A1* | 2/2007 | Heckenbach ................ | 707/200 |
| 2007/0038610 | A1* | 2/2007 | Omoigui ...................... | 707/3 |

(Continued)

FOREIGN PATENT DOCUMENTS

WO WO 2009/046435 4/2009

OTHER PUBLICATIONS

PCT International Search Report dated Dec. 11, 2008, 2 pages.

(Continued)

Primary Examiner — Angelica Ruiz

(57) ABSTRACT

A system and method for searching content. The method comprises receiving from a first user metadata relating to generating a guide for content. A guide is generated relating to the content. The guide facilitates navigation of the content on a device. The metadata is forwarded to a metadata analyzer where the metadata is processed to produce processed metadata. The processed metadata is forwarded to an index server. An index is generated for the content based on the metadata at the index server. A query is received from a second user, the index is searched and a result is forwarded to the second user in response to the query. The result includes at least a uniform resource identifier relating to at least some of content. The second user may add additional metadata relating to the content.

35 Claims, 3 Drawing Sheets

(56) References Cited

U.S. PATENT DOCUMENTS

| | | | |
|---|---|---|---|
| 2007/0101394 A1 | 5/2007 | Fu et al. | |
| 2007/0112761 A1* | 5/2007 | Xu et al. | 707/5 |
| 2007/0157247 A1 | 7/2007 | Cordray et al. | |
| 2007/0166013 A1 | 7/2007 | Yogeshwar et al. | |
| 2007/0255670 A1* | 11/2007 | Ruf et al. | 706/50 |
| 2007/0288918 A1* | 12/2007 | Gouge et al. | 717/174 |
| 2007/0299976 A1* | 12/2007 | Zafar et al. | 709/229 |
| 2008/0036917 A1* | 2/2008 | Pascarella et al. | 348/702 |
| 2008/0059989 A1* | 3/2008 | O'Connor et al. | 725/9 |
| 2008/0082381 A1* | 4/2008 | Muller et al. | 705/7 |
| 2008/0086747 A1* | 4/2008 | Rasanen et al. | 725/46 |
| 2008/0155627 A1* | 6/2008 | O'Connor et al. | 725/109 |
| 2008/0201225 A1* | 8/2008 | Maharajh et al. | 705/14 |
| 2008/0201386 A1* | 8/2008 | Maharajh et al. | 707/201 |
| 2008/0201753 A1 | 8/2008 | Arling et al. | |
| 2008/0207137 A1* | 8/2008 | Maharajh et al. | 455/74 |
| 2008/0207182 A1* | 8/2008 | Maharajh et al. | 455/414.1 |
| 2009/0106202 A1 | 4/2009 | Mizrahi | |
| 2009/0119576 A1 | 5/2009 | Pepper et al. | |
| 2011/0208822 A1 | 8/2011 | Rathod | |

OTHER PUBLICATIONS

International Search Report Dated Dec. 11, 2008 From the International Searching Authority Re.: Application No. PCT/US08/78971.
Written Opinion Dated Dec. 11, 2008 From the International Searching Authority Re.: Application No. PCT/US08/78971.
Communication Pursuant to Rules 70(2) and 70a(2) EPC Dated May 23, 2011 From the European Patent Office Re. Application No. 08836433.6.
Supplementary European Search Report and the European Search Opinion Dated May 3, 2011 From the European Patent Office Re. Application No. 08836433.6.
Hotho et al. "Information Retrieval in Folksonomies: Search and Ranking", The Semantic Web: Research and Applications, 3rd European Semantic Web Conference, ESWC 2006, Budva, Montenegro, XP019034130, 4011: 411-426, Jan. 1, 2006. Abstract, p. 411, Lines 21-25, p. 412, Lines 26-38, p. 415, Lines 1-8, p. 416, Lines 17-20.
TVersity "TVersity: Faq. Table of Contents", TVersity, XP002632209, p. 1-26, 2006.
International Preliminary Report on Patentability Dated Nov. 22, 2011 From the International Preliminary Examining Authority Re. Application No. PCT/US2008/078971.
Official Action Dated Oct. 5, 2011 From the US Patent and Trademark Office Re. U.S. Appl. No. 12/681,122.
Response Dated Nov. 27, 2011 to Communication Pursuant to Rules 70(2) and 70a(2) EPC of May 23, 2011 From the European Patent Office Re. Application No. 08836433.6.
Official Action Dated Sep. 4, 2012 From the US Patent and Trademark Office Re. U.S. Appl. No. 12/681,122.
Official Action Dated 31 Jul. 2013 From the US Patent and Trademark Office Re. U.S. Appl. No. 12/681,122.

\* cited by examiner

SYSTEM AND METHOD FOR ENABLING SEARCH OF CONTENT

This application claims priority to U.S. provisional application Ser. No. 60/977,704 filed Oct. 5, 2007 entitled "Collaborative Search of Opaque Content", the entirety of which is hereby incorporated by reference.

BACKGROUND OF THE INVENTION

1. Field of the Invention

This disclosure relates to a system for enabling search of content, and, more particularly, to a system which can enable indexing of, and queries upon, opaque content.

2. Description of the Related Art

Referring to FIG. 1, the World Wide Web ("WWW") is a distributed database including literally billions of pages accessible through the Internet. Searching and indexing these pages to produce useful results in response to user queries is constantly a challenge. A device typically used to search the WWW is a search engine.

A typical prior art search engine 50 is shown in FIG. 1. Pages from the Internet or other source 22 are accessed through the use of a crawler 24. Crawler 24 aggregates documents from source 22 to ensure that these documents are searchable. Many algorithms exists for crawlers and in most cases these crawlers follow links in known hypertext documents to obtain other documents. The pages retrieved by crawler 24 are stored in a database 36. Thereafter, these documents are indexed by an indexer 26. Indexer 26 builds a searchable index of the documents in database 34. For example, each web page may be broken down into words and respective locations of each word on the page. Indexer 26 may also analyze the pages and extract textual metadata. The pages are then indexed by the words and/or metadata and their respective locations.

In use, a user 32 sends a search query to a dispatcher 30. Dispatcher 30 compiles a list of search nodes in cluster 28 to execute the query and forwards the query to those selected search nodes. The search nodes in search node cluster 28 search respective parts of the index 34 and return sorted search results along with a document identifier and a relevance score to dispatcher 30. Dispatcher 30 merges the received results to produce a final result set displayed to user 32 sorted by relevance scores based on a ranking function.

The creation of a comprehensive search engine for Internet multimedia content including audio, video and photos is so far an unachievable task. While search engines for documents and web pages are now very common and have been able to deliver good results, multimedia content does not lend itself to the same techniques used with textual documents and hence remains mostly not indexed and hard to find.

The challenge with multimedia content has to do with the fact that it is very hard to associate multimedia objects with textual metadata used in indexing. This is unlike textual documents from which keywords can be extracted and used for indexing of the document for later retrieval. With multimedia content, more often than not, no textual representation of the content is available and known methods to automatically generate a textual representation (for example by employing speech to text techniques) are very computationally intensive.

Since in many cases the multimedia content on the Internet is enclosed in some textual web page, a possible solution may be to use keywords from that page. However any given page may have many different multimedia objects enclosed and so it is difficult to determine what keywords relate to what object. Other approaches require the analysis of the multimedia content such as using computer vision techniques, in the case of video and images, or speech recognition for audio, in order to create a textual description of the content. To date, those techniques are unable to produce a useful multimedia search engine.

Another challenge pertaining to multimedia content is related to its discovery. Unlike web pages, the URL pointing to the actual media are sometimes buried in MACROMEDIA FLASH, JAVASCRIPT, JAVA and other hard to analyze code that makes it virtually impossible to quickly crawl the web and find new media. While a web crawler today discovers new content by simulating a person using a web page and by following all the links in the page, crawlers perform the process only by analyzing the HTML (hypertext markup language) code of the page. Even this rapid analysis leaves large portions of the web uncharted and undiscovered since the web grows too fast. Going beyond pure HTML analysis will slow a crawler to the point that it becomes too slow to produce sufficient coverage.

Several methods have been attempted to date to extract descriptive textual metadata from multimedia content or to use such readily available textual descriptions (when available). None of them have proven sufficient to build an Internet multimedia search engine.

SUMMARY OF THE INVENTION

One embodiment of the invention is a method for enabling search of content, the method comprises receiving from a first user metadata relating to generating a guide for content and generating the guide for the first user relating to the content, the guide facilitating navigation of the content on a first device. The method further comprises receiving the metadata at a metadata analyzer, processing the metadata at the metadata analyzer to produce processed metadata, forwarding the processed metadata to an index server; and generating an index for the content based on the processed metadata at the index server.

Another embodiment of the invention is a system enabling search of content. The system comprises a first device connected to the internet and an application effective to receive metadata relating to generating a guide for content, the application further effective to generate a guide for a first user relating to the content, the guide facilitating navigation of the content on a second device. The system further comprises a metadata analyzer connected to the media manager server, the metadata analyzer effective to receive and process the metadata to produce processed metadata. The system further comprises an index server connected to the metadata analyzer, the index server effective to receive the processed metadata from the metadata analyzer and to generate an index for the content based on the processed metadata.

BRIEF DESCRIPTION OF THE DRAWINGS

The drawings constitute a part of the specification and include exemplary embodiments of the present invention and illustrate various objects and features thereof.

DETAILED DESCRIPTION OF THE PREFERRED EMBODIMENT(S)

Figure 1:
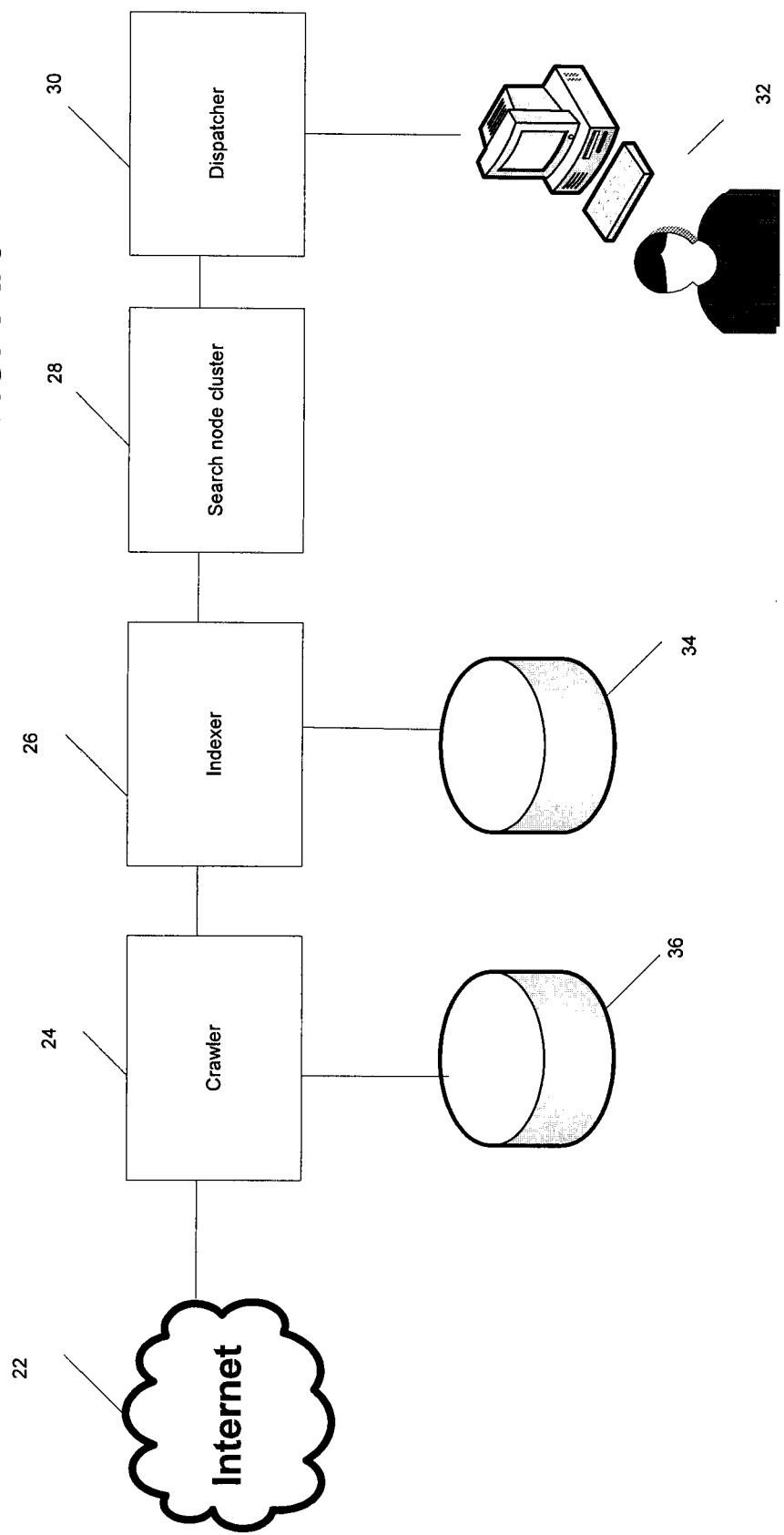
FIG. 1 is a system diagram of a search engine in accordance with the prior art.

Various embodiments of the invention are described hereinafter with reference to the figures. Elements of like structures or function are represented with like reference numerals throughout the figures. The figures are only intended to facilitate the description of the invention or as a limitation on the scope of the invention. In addition, an aspect described in conjunction with a particular embodiment of the invention is not necessarily limited to that embodiment and can be practiced in conjunction with any other embodiments of the invention.

In the described systems and methods, human beings are used to discover new available content and to generate metadata facilitating search of that content. Users are motivated to generate metadata for content because the generation of the metadata is beneficial for them. Furthermore, users may not be consciously thinking about a side effect of their activity, which is generating metadata for the benefit of others.

Figure 2:
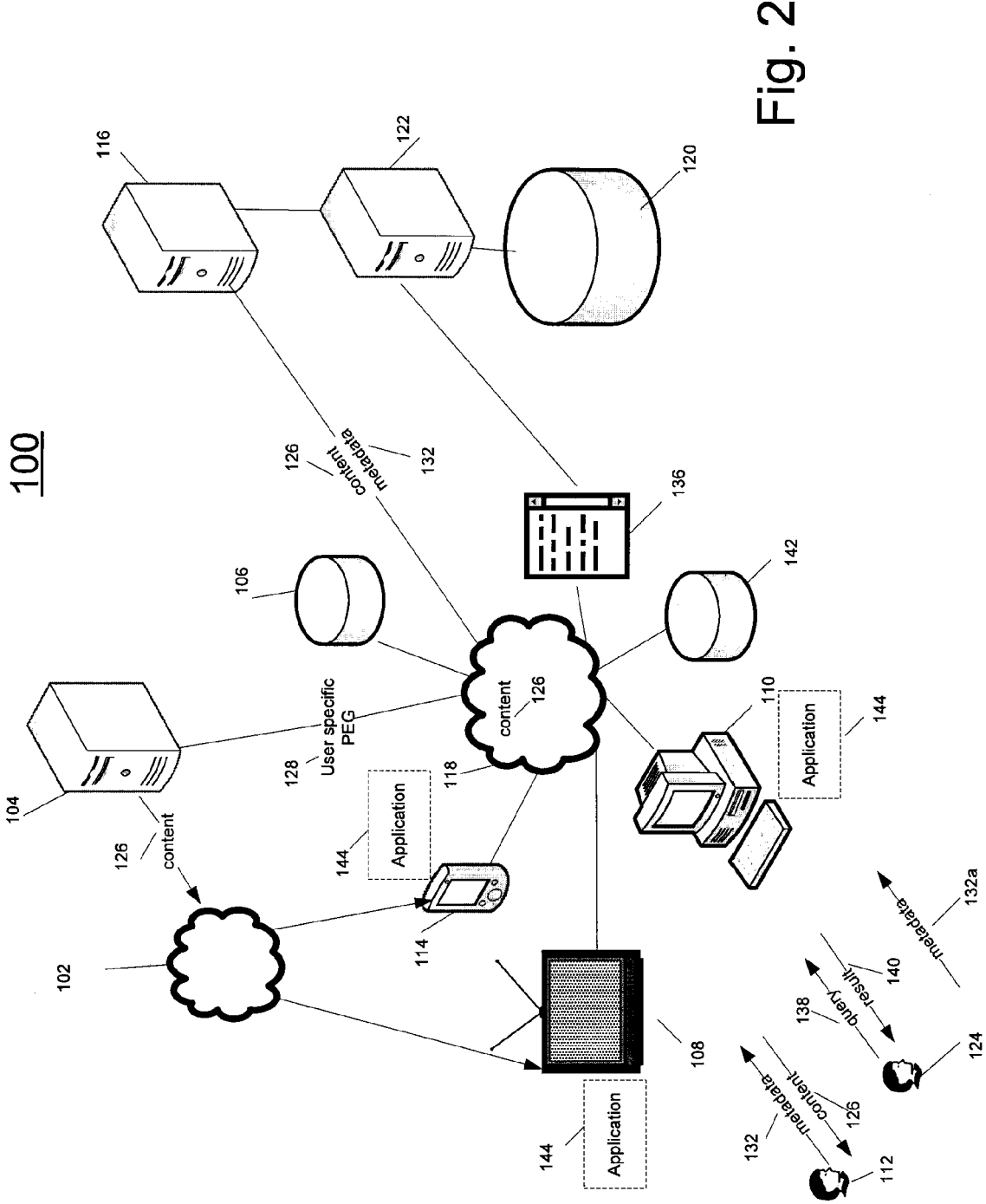
FIG. 2 is a system drawing of a system in accordance with an embodiment of the invention.

Referring to FIG. 2, there is shown a system 100 in accordance with an embodiment of the invention. As shown, a user 112 can view, listen, or simply locate content 126 from a network such as the Internet 118 through the use of a device such as a computer 110, television 108, internet enabled phone 114, etc. Devices include, for example, stationary devices (e.g. TVs or devices connected to TVs such as Set-Top-Boxes, game consoles, digital media adapters, networked DVDs, networked home theater system, etc.) or mobile devices (phones, smart phones, PDAs, mobile media players, mobile communicators, etc.).

With the proliferation of content 126 on the Internet 118, it may be desirable for user 112 to create a guide of content 126 that the user enjoys. In prior art systems like those relating to viewing of television content, a program guide can be created summarizing the content of all available channels. This may work when there are a few hundred channels. However, the content available on the Internet is much larger than many hundred discrete units and it is desirable to provide a user with a means to create a guide of content of interest.

In system 100, user 112 receives or identifies content 126 and can start the creation of personal entertainment guide (PEG) 128 including, for example, a personal menu hierarchy facilitating navigation of content 126 on devices 108, 110, 114. For example, after locating or while viewing or listening to a web site with content 126 of interest on a device connected to the Internet, user 112 may copy and paste a URI (uniform resource identifier) such as the URL (uniform resources locator) associated with content 126 into an application 144 running on computer 110. Alternatively, the web site may include a navigation button or the user's browser may include a toolbar with a navigation button that, upon actuation, opens up application 144. Application 144 may run on computer 110 or on any of the other devices 108, 114. Software application 144 allows user 112 to start the creation of a PEG 128 by allowing user 112 to associate metadata 132 with content 126. Metadata 132 may be used by user 112 to index content 126 available on the Internet 118. Thereafter, PEG 128 may be created by application 144 and may facilitate the navigation of content 126 on computer 110 including a keyboard interface or a device less capable of displaying Internet and/or HTML data than a computer—such as television 108 or phone 114 without a keyboard interface. Such devices have limited user interfaces and viewing of content 126 on these devices may benefit from a PEG 128 created on a computer 110 with a more sophisticated interface.

User 112 may generate metadata 132 using a computer 110 and then view or listen to content 126 on, for example, a television 108 or phone 114 with the benefit of PEG 128. Media server 104 can provide PEG 128 in the form of navigation menus to devices so that users can choose content or perform a search by keyword or other metadata. The navigation menus provide a menu navigation hierarchy and allow navigation by different attributes or metadata entered by user 112. For example, navigation may be performed by name, genre, artist, tags, creation date, etc. Each type of media (music, TV, movies, photos) has some natural navigation criteria and system 100 may create PEG 128 based on this criteria and metadata 132 for the user. The user may customize and add/remove some of these navigation criteria. For example:

Music can be navigated by: track name, playlist, genre, artist, album, composer, album artist (potentially different from track artist), conductor, genre->artist->album, artist->album, tags, release date, release date->album, etc. Movies can be navigated by: title, playlist, genre, publisher, release date, tags, language, rating, actors, producers, directors, etc. Photos can be navigated by title, album, date taken, playlist, tags, photographer, etc. Radio stations can be navigated by name, genre, language, country, tag, etc.

Regarding the above, user 112 may enter some of metadata 132, other users may add more and the rest of system 100 can acquire even more metadata by using GOOGLE, Wikipedia, etc. (discussed below). Consequently, hierarchical navigation and search within a single PEG is automatically performed by system 100 (either by application 144 or by media server 104).

PEG 128 is of course not limited to hierarchical views and search by keywords. Other views, for example a table view (like an electronic program guide) showing content on one axis, and time on the other axis can be used. This can be used for live channels but also for on demand channels where the time represents the release date of some album or movie or the time a photo was taken, etc.

Content 126 may be provided to device 108, 110, 114 over a network 102 such as a wide area network, cell network, local area network, etc. by media server 104. Media server 104 uses device specific or known interoperability standards such as UPnP A/V (universal plug and play audio visual), DLNA (digital living network alliance), Bonjour, DPWS (devices profile for web services) to translate content 126 into an appropriate form for device 108, 110, 114. Media Server 104 thus extends the functionality of devices 108, 110 114 to navigate, search, play and record, audio and video content 126 from Internet 118.

In the process of generating their own PEG, users 112 associate metadata 132 with the opaque multimedia content 126 and hence enable the indexing of content 126 (as discussed below). Aggregating metadata 132 contributed by all users as they create their PEG allows for searching of content 126.

A content repository 106 may be connected to device 108, 110, 114 and receive and organize content from multiple users. Content repository 106 may run at a single location or may be a distributed database across a network. PEGs 128 are aggregated and stored in content repository 106. PEG 128 may be forwarded to media server 104 so that media server 104 can translate content 126, if desired, and forward content 126 to user 112, possibly through a network 102 (such as, for example, a cellular telephone network to telephone 114). If needed, media server 104 can access content 126 from the Internet 118. Media server 104 may be on device 108, 110, 114, on a set top box, on internet 118, in application 144, etc. PEG 128 may also be forwarded to user 112 and stored in, for example, a library 142. User 112 may thereafter use PEG, including for example created menu hierarchies, to navigate content 126 on a device.

In creating PEG 128, each user 112 may submit metadata 132 in application 144 for content 126 including fields such as:

URI—The unique location of content 126 on the Internet 118.

User ID—an identification that allows system 100 to identify all content from the same user 112.

Title—The name for content 126 as chosen by the user.

Description—A description provided by the user.

Source—The location on the Internet of the source from which the content was taken (e.g. a video on the NBC website will have as its source the nbc.com URL).

Language—Both of the media and of the metadata (metadata language can be derived from user's country of origin).

Country—The country of origin for the content (can be derived from the Source or provided by users).

Tags—Any set of labels, keywords, phrases or sentences that user 112 wishes to associate with the content in order to browse it later on by these tags. Tags can be hierarchical, which will enable hierarchy in browsing. For example a user 112 can tag a music video by U2 as "artist.U2". This will allow a navigation tree on devices that looks like this:

Tags
Artist
U2

Tags can also allow a free form for submission of other fields, for example the tag "source.BBC" can be used to designate the source instead of the source field, and the tag "language.English" can be used to designate the language. In order to facilitate consistent use of certain tags among users, system 100 may offer some guidelines as well as auto-complete of tags while users are typing them. For example, the top 10 or 20 most popular combinations starting with a first letter entered by a user may be displayed to the user (e.g. "s" yields "Source", etc.). Tags may also include:

Explicit rating—Users can report any content as including explicit material.

Spam rating—users can report content as spam.

Playlists—Tags may also include: playlists in which the user placed this content. A playlist may include a name, a list of URLs and some or all of the metadata described above with the exception the URL could be on the user's home machine and not on the Internet. Each item in the playlist may also have the following:

Rating—A user assigned numeric measure describing fondness of the user with respect to the content.

Discovery—Indicating whether the content discovered by the user, suggested by system 100 or suggested by another user.

Comments—Users may comment to suggestions made by system 100, or other users, and they can also comment to their own discoveries.

Acceptance—If the content was suggested by the system or by some other user system 100 may capture whether the suggestion was accepted or not.

Textual description mapped to the media timeline—This includes, for example, subtitles for video or lyrics for music.

Icon/thumbnail—Some visual image associated with the content.

Playback percentage—how often the user plays the content.

Other—a custom category named by the user and for which the user provides some value(s). This can be treated as a set of name and value pairs.

User 112 may define a real or virtual library 142 of content 126 that the user desires to listen or view including PEG 128, and content in the playlists. Library 142 may be stored at, for example, device 108, 110, 114, media server 104 or at any other location such as across Internet 118 and may include content 126 or URIs to where content 126 may be accessed.

Metadata 132, along with content 126 or URLs of content 126, is sent by a plurality of users 112 (only one is shown) through applications 144 over a network such as the internet 118 to a metadata analyzer 116. For example, a list of metadata may be associated, for each URI. Metadata analyzer 116 reads metadata 132 from a plurality of media manager servers 106 and processes metadata 132 so that metadata 132 may be indexed by an index server 122 such as an APACHE Lucene or Solr component. For example, metadata analyzer 116 may normalize, verify, and analyze for duplicates, spam, explicitness, popularity, etc. metadata 132 (as is discussed below).

In addition to user submitted metadata 132, metadata analyzer 116 processes metadata fields embedded in content 126, such as headers and footers, and extracts information that is represented in a computer readable form. This process adds for example, the following fields:

Size—typically for non live media; duration—typically for non live media; format—the mime type and codec version for audio and video; bitrate—the bitrate in which content 126 was encoded (may be separate for audio and video); resolution—the video resolution; frames per second—for video, values typically range from 12 to 60 with 29.97 being the value for videos complying with the NTSC standard and 25 fps being the value for videos complying with the PAL standard (film is at 24 fps); sampling frequency—the audio sampling frequency in which the content was digitized; sample size—the size of each audio digital sample (typically 8 bits, 16 bits, 24 bits or 32 bits); number of audio channels—mono, stereo, surround 2.1, 3.1, 5.1, 7.1 etc.; metadata embedded inside content 126—some formats have evolved to embed metadata inside media files.

These fields allow metadata analyzer 116 to extract some textual data about content 126. For example audio files in MP3 format have a tagging format called ID3, which is embedded inside the audio files. Ogg vorbis files have a tagging format called Vorbis Comments. JPEG images have a tagging format called EXIF and so on. Each of those files suggest a set of new fields and allow metadata analyzer 116 to assign those fields a value. Additional metadata may be added as new formats are created or existing ones evolve.

In its simplest form metadata analyzer 116 takes all the values from all the users provided under the same field for the same URL, in addition to fields created by metadata analyzer 116 and constructs a textual document for each URL. This document is broken into fields, which works well for APACHE Lucene, and can be fed to indexer 122 for indexing.

Metadata analyzer 116 may also create the keywords and phrases for each field (in APACHE Lucene language these are called terms) and associate with the keywords and phrases the statistical measures that apply to them.

Metadata analyzer 116 takes into account terminology that is typical to system 100 and adds additional fields based on this terminology. For example if the terms "music video", "movie trailer", "feature film", "MPAA rating" are typical in a video domain, metadata analyzer 116 will identify them and add a category field that allows metadata analyzer 116 to categorize content 126 beyond just the top level of audio, video, images to a more fine grained set of categories including these fields.

Similarly metadata analyzer 116 can identify words and terms that are associated with explicit materials based on an explicit metadata field supplied by user 112 and create an explicit measure for the content. Metadata analyzer 116 may issue a search in the Internet such as Wikipedia or in the IMDB website or in GOOGLE using keywords generated from metadata 132 such as, for example, the title. For example, if the header of the content indicates that the content is video, a search of the IMDB web site or a search of general search sites in the movie section will be performed. This search lets metadata analyzer 116 find additional text documents that are descriptive of content 126. For example, the highlighted most relevant section returned by GOOGLE or a similar tool may be used. These additional documents can then be used to further improve indexing of content 126.

Metadata analyzer 116 can also identify spam, explicitness, and prominence of content 126 as is discussed below. Fields may be added by metadata analyzer 116 such as: number of users that have a given content in their library 142 to determine popularity; number of users that reported content 126 as explicit; number of users that reported content 126 as spam. This information may come from user 112 in metadata 132 or from other users 124 who issue queries 138 on index 120 as is discussed below. Other types of fields may be derived from user submitted tags. Some tags in metadata 132 (like genre, artist, source, language, etc.) can be mapped to corresponding fields of the same title. For example, a tag stating "English" can be mapped to the field "language".

Metadata analyzer 116 can create some metadata relevant to particular users and use the metadata later on to create additional metadata for content in the library 142 of that user. For example, for a particular user 112a (not explicitly shown) that has many items (e.g. 60%) that were considered explicit or spam, metadata analyzer 116 may consider new content submitted by this user 112a, identified by his user ID, as explicit or spam, until proven otherwise (this is in contrast to the traditional approach of assuming media is not explicit and not spam unless proven otherwise). By creating metadata for particular users, indexer 112 may choose to show results 140 (or order results 140) that were submitted by such users only to other users that have expressed their consent to get explicit materials or very new content (knowing that within new content, spam rates are higher than otherwise). For example, if a user with a user ID 456 submits metadata 132 including an explicit field 60% of the time, metadata analyzer may make note of this in indexer 122. Results to user 456 are thereafter affected.

Index server 122 may apply some translations to the metadata 132 and verifications on content 126. For example, index server 122 can test to see whether identified URLs work and deliver an expected media type. Addresses that do not work or media that has been moved may be appropriately labeled. Index server 122 also implements an efficient and scalable index 120 and enables the execution of queries against index 120. For example, user 112 that entered metadata 132 or another user 124, may issue a query 138 over a network such as the Internet 118 to a web page 136 hosted by a web server connected to an index server 122. Searching may also be performed in application 144 within a set top box, phone, etc. Index server 122 may thereafter consult index 120 for results 140 to queries 138. Results 140 include information about content 126 including, for example, a URI/URL of content 126 so that user 112, 124 can access content 126. Web page 136 allows users 124 to execute search queries 138 against search index 120. Web page 136 also allows browsing by metadata and by categories such as recently added, top rated, most popular and others.

The different fields in metadata analyzer 116 associated with content 126 may be prioritized compared to one another so that ranking of results 140 in response to query 136 may be performed. In APACHE Lucene terminology these fields may be boosted. Metadata analyzer 116 may start with a static prioritization (for example tags are more important than description but less important than title). Metadata analyzer 116 may check, for each user, how well each field matches the aggregate values for the field, and based on this calculation, refine the initial weights on a per user basis. Certain users may also receive higher ranking than other users based on the same type of matching. For example, a field for a particular user with values matching a corresponding field of many other users will get a higher weight. These fields may be weighed higher for that user. Statistical measures (e.g. mean, median, etc.) of the weight of each field for all users may be calculated to further refine weights.

To identify prominence of content (used in ranking results 140), some factors that may be used are the number of users that have a particular content 126 in their library 142, a number of times the content is played by users (as reported in metadata 132), the prominence of the source of the content (e.g. using GOOGLE PAGERANK or a similar tool), the rating given by users, acceptance/rejection ratio, etc. These measures may be combined in a way that is category specific, meaning that for music, the number of times content 126 is actually played may be more important than having content 126 in a library 142, while for movies or movie trailers this is not the case. Also, since popularity changes over time, these measures may be restricted to the last x number of days in order to identify fashionable content versus content that is an all time favorite.

Metadata analyzer 116 thus enables the creation of an index of content by keywords and phrases, and can calculate prominence and popularity of the content. Metadata analyzer 116, along with index server 122, can recommend content 126 to user 112 by identifying metadata 132 input by user 112 and searching for this metadata in index 120. This recommendation can be performed while the user enters metadata 132.

System 100 may make recommendations to users by identifying similar PEGs and clustering them as an interest group and then recommending to users that belong to a given interest group, items from that group that they do not have. For example, system 100 may identify the top (e.g. 10) keywords in metadata 132 and search index 120 for results relating to those keywords or search metadata 132 of other users to identify metadata that have Y % (e.g. 50%) matching keywords. The results may be used as recommendations. Additionally, metadata analyzer 116 can suggest users with shared interests to connect such as by using users who have been identified as "friends" or users who have metadata or PEGs with a defined percentage overlap.

In order to allow the community of users to police itself and to further refine the metadata 132, the interaction of users 112, 124 is analyzed as well. Users 112, 124 can rate results 140 produced by index server 122 and the rating information is fed back to metadata analyzer 116. The rating information may be used for detecting popular items, spam, duplicates, explicit materials, etc. For example, users 112, 124 can add any of the metadata discussed above and forward this additional metadata 132a to metadata analyzer 116 to facilitate further indexing.

The kind of metadata 132a that system 100 can collect from users 124 through the interaction with web page 136 includes: relevancy of results 140 to search query keywords, popularity of keywords over time (such as through GOOGLE TRENDS), personal context for ambiguous words and phrases, etc. All allow correlation of user metadata (geographic, demographic, etc.) to items of preference (for example to identify differences between different regions of the world or different age groups). For example, if a user profile is known, system 100 can associate keywords with a demographic and location. Even without a user profile, other information such as IP address, WI-FI hot spot location, cell tower, etc., may be used.

Additionally users 112, 124 can add results 140 into their own respective PEG 128 in a click of a button on device 108, 110, 114 using application 144 (as discussed above) and then use media server 104 to play content corresponding to result 140 on device 108, 110, 114 of choice. Users 112, 124 can subscribe to content corresponding to results 140 by adding result 140 to their respective PEG 128, thus having constant access to the list of search results on all their devices. These features demonstrate the synergistic relation between the different components of system 100.

As can be realized, even if new content 126 is added to internet 118 with very little metadata, as long as the URL corresponding to the content can return in response to some search queries (discussed above), other users may add it to their PEG and contribute additional metadata. Therefore system 100 is constantly refining and improving its index.

For new content 126 that has no metadata 132, such as a URL or RSS feed, system 100 can expose such content 126 to users 112, 124 via web page 136 under a category of newly added media. This can be communicated to users 112, 124 as a method to discover the newest media in system 100. Users 112, 124 may try this content 126, add it to their PEG 128 and thereafter contribute new metadata 132, 132a to system 100 to make this new content 126 searchable. The ability to start with content 126 that has no metadata 132 allows system 100 to integrate a traditional web crawler that mines the web for new multimedia content, and rely on users 112, 124 to add metadata to newly discovered media.

One of the problems when aggregating content from many sites is identification of duplicates. Automatic analysis of content and the creation of a unique identifying signature is used by metadata analyzer 116 to eliminate many duplicates or more accurately cluster them. For example, if two users identify the same URI/URL, system 100 knows that the content from these users is the same. Other types of duplication algorithms such as using a hash (like MD5) on the content may be used, users may simply identify duplicates, or more computationally intensive algorithms may be used to define signatures for content that may be compared (such as, for example, performing a fourier or fast fourier transform on the content).

As can be discerned, system 100 creates an incentive for users 112 to provide metadata 132 for content 126. The incentive is inherently valuable and hence carried out by users 112 on a regular basis. System 100 is even more valuable when the resulting search from index server 122 reinforces the value of the incentive system. The search and the incentive system feed one another and increase the value of system 100 as a whole—this is the synergistic relationship mentioned before.

In the case of multimedia content, users are accustomed to rely on a programming guide and on a lineup of audio and video channels that is available to them. With Internet multimedia content, there is so much content out there that a single all-inclusive programming guide is not feasible. Instead users may select the media that they wish to have readily accessible on their program entertainment guide, or in their personalized lineup of channels. It is this personalization process in which users identify favorite content and organize and add metadata for later access that system 100 taps in to. It is an incentive system for multimedia content.

The metadata users provide when they select and organize their preferred content can be used to index the multimedia items in their collection and to create a multimedia search engine. This search engine can then be used to aid other users in discovering and finding content; this is how the personalization process reinforces the search engine and the search engine in return reinforces the personalization process.

Another benefit is that new content can be added with very basic metadata, and users that discover it via the search engine and add it to their personal collection or ignore it, will assist in improving the metadata for the content and hence the search results. Users self police the metadata and eliminate bad metadata submitted by content owners or by other users.

The interaction of users with system 100 is by itself an activity that provides metadata and hence the entire process from the moment users search for content until they find their desirable result and personalize it, is providing new metadata. This metadata can be used to improve the indexing and the ranking of content. Furthermore the integration between the search engine and the personalization allows the system to measure the relevancy of search results. Metadata is added because it is not presented as such but rather it is a bi-product of a natural user process. Users desire to customize their PEG because there is simply so much content available.

The content on the Internet is being created for access from computers. Prior art solutions do not allow users to access Internet content from their TV and other connected devices, due to the limitation of those devices when compared to the computer. System 100 leverages this phenomenon by including a media server that can deliver Internet content selected by users to the devices of choice for those users.

System 100 allows users to customize their own personal entertainment guide comprising content they choose, and that the content becomes available to the users on all their devices. Enabling access to Internet multimedia content from televisions poses some unique challenges. The television viewing experience is mostly passive and is often related to as a "lean back" experience, in contrast to the "lean forward" non-passive experience of using a computer.

This fundamental difference is also evident in the different types of accessories used to control those devices. The TV is typically controlled via a remote control, with only a few buttons used on regular basis, while the computer is typically controlled with a keyboard and mouse, which allow for a much wider range of operations. The viewing distance for TV is much larger than computers, which essentially requires everything to be made bigger or else it won't be visible. This means that less content can be displayed on a TV screen. On the social side, TVs are often viewed in groups while computers are mostly used individually.

The unique properties of TV as a device combined with the fact that content on the Internet is designed for computers and not TVs mean that simply connecting a computer to a TV screen (or putting a web browser on the TV in some other means) does not work well. The content will be hard to see, or when magnified, the layout gets distorted, and with no keyboard and mouse, even just selecting something becomes a difficult and time consuming task.

System 100 makes multimedia content easily accessible from TVs. In order to do this, system 100 creates a TV friendly representation of Internet content. This can be compared to the traditional electronic programming guide, which is a TV friendly representation of traditional TV content. In order to create a TV friendly representation of Internet multimedia content one may distinguish between two types of content:

Type I: Content that users have expressed interest (explicitly or implicitly).

Type II: All the rest.

PEG 128 includes a hierarchical set of menus customized to the content of choice of any given user. This menu may be similar to the menus offered today for on-demand content but is created by the end users (as opposed to being dictated by content providers). System 100 introduces new ways for finding and discovering new content and possibly turning it from Type II to Type I.

Users can find new content by executing a textual query to search for Internet multimedia content that satisfies some criteria. This query will return results 140 with the relevant Internet content, ready for playback. Another method for content discovery, is to add a television channel for content discovery that randomly exposes people to new Internet content (possibly from some high level category or categories) and based on the user's decision to watch the content or not, (effectively metadata 132 for that content) the system can learn what the users like and dislike.

An other method for the discovery of new content is to add some channels for most popular content, most watched, most highly rated, most recently added and so on (again this can be global or on a per category or categories basis, such as movie trailer).

Yet another method for the discovery of new content is to make recommendations of Type II content based on Type I content. Each user can start using the system with no Type I content and build it over time. The process of turning Type II content to Type I content is as follows:

Users come across Type II content that they like, whether via the means described above for the system to expose them to Type II content or by some other means external to the system. Users thereafter explicitly or implicitly turn content to Type I.

Explicitly changing content to Type I is done mainly when the content was discovered via methods external to the system. In such a case users add the content by providing its URL and describing where it should be placed in their PEG for Type I content. To help users, the system can start with some basic Type I menu system (instead of an empty one) for the PEG that can be customized as users see fit. An example of a possible initial menu system is:

Audio
  Music
  Radio stations
  Audio books
  Podcasts
  Other
Video
  Movies
    Trailers
    Full
  TV Shows (on demand)
  TV Channels (live)
  Music Videos
  Podcasts
  Game Trailers
  Other
Photos
  Personal
  Others Users that come across content such as, for example, a TV episode that they like, can subscribe to the entire show or just add one episode and select to add it under TV shows in their PEG. Users that come across a webcam video that they like can add a new video category for webcams and add it to their PEG. Users can add content such that it will be placed in the menu system in more than one location so if the webcam was of interest to a specific family member the user could add a menu entry under video with the name of that family member and add the webcam video there as well.

Figure 3A:
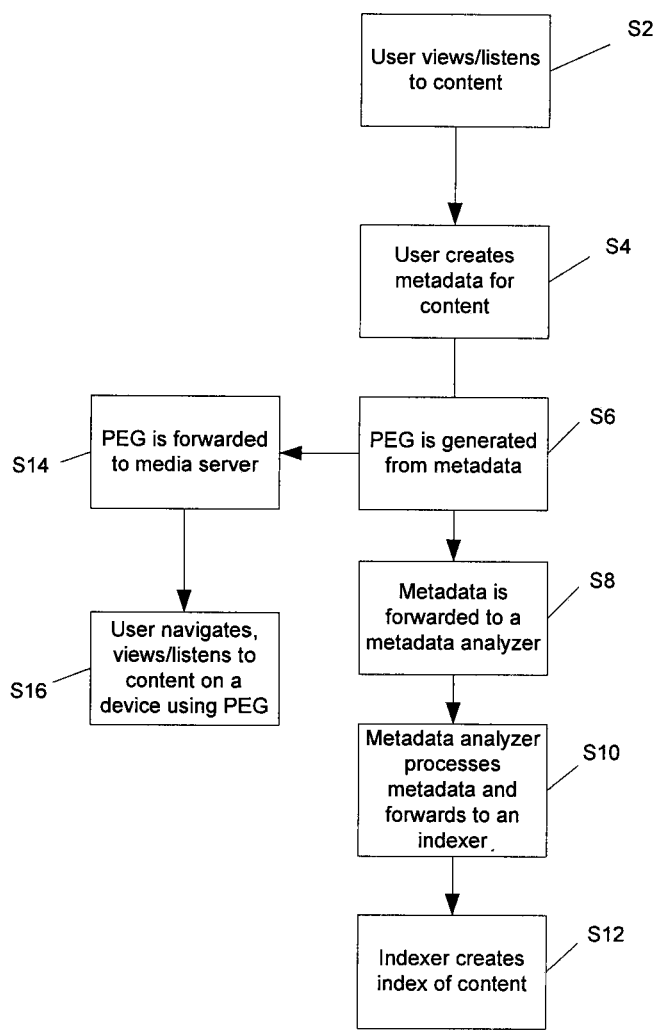
FIG. 3A is a flow diagram illustrating a process which could be performed in accordance with an embodiment of the invention.

Referring to FIG. 3A, there is shown a flow chart illustrating a process which could be performed in accordance with an embodiment of the invention. The process could be performed with, for example, system 100 described above. As shown, at step S2, a user may view or listen to content from, for example, the Internet. Such content may be found by the user or may be suggested by system 100. The user may decide that he is interested in cataloging or keeping track of the content so that it may be later easily accessed or in creating a menu hierarchy so that the content may be easily accessed on another device. To do this, at step S4, the user may associate metadata with the content so that a PEG may be generated. At step S6, a PEG is generated for the user and forwarded to a media server at step S14 so that the user may navigate, view or listen to the content on a device using the PEG at step S16.

At step S8, the media manager server also forwards the metadata to a metadata analyzer. The metadata analyzer, at step S110, processes the metadata, optionally adds more metadata, and forwards the metadata to an indexer. At step S12, the indexer creates an index of the content. The indexer may thereafter be queried for results.

Figure 3B:
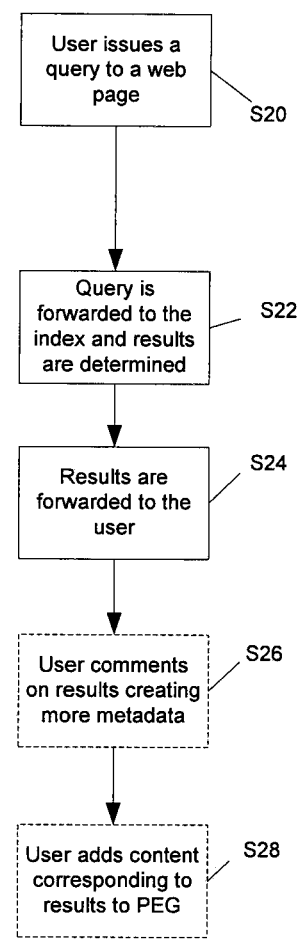
FIG. 3B is a flow diagram illustrating a process which could be performed in accordance with an embodiment of the invention.

Referring to FIG. 3B, there is shown a flow chart illustrating a process which could be performed in accordance with an embodiment of the invention. The process could be performed with, for example, system 100 described above and the process described with reference to FIG. 3A. At step S20, a user may issue a query to a web page requesting particular content. At step S22, the query is forwarded to an index and results are determined. The results may be ranked as discussed above. The index may be, for example, the index created in step S12. At step S24, the results are forwarded to the user. Optionally, at step S26, the user may comment on the results creating more metadata for corresponding content. Additionally, at step S28, the user may add content corresponding to the results to his/her PEG or library.

Described is a system in which the collective efforts of the community to organize their media are harnessed to solve one of the most difficult problems today on the web, the absence of an effective search engine for opaque content. A media server adds value to users by making their media accessible anywhere, anytime and from any device and thus provides an incentive for users to create their personal entertainment guide. System 100 offers inherent value to users and does not request them to organize their media for the sake of organization, but rather suggests that they organize so that they can navigate it, access it, play it, listen to it, and watch it from their devices.

The invention has been described with reference to an embodiment that illustrates the principles of the invention and is not meant to limit the scope of the invention. Modifications and alterations may occur to others upon reading and understanding the preceding detailed description. It is intended that the scope of the invention be construed as including all modifications and alterations that may occur to others upon reading and understanding the preceding detailed description insofar as they come within the scope of the following claims or equivalents thereof. Various changes may be made without departing from the spirit and scope of the invention.

What is claimed is:

1. A computerized method for managing a personalization process in which users create metadata enabling a search of content using a computerized processor and for performing the search, the method comprising:
   identifying a plurality of internet video content items in a network;
   communicating said plurality of internet video content items to a plurality of client devices of a plurality of users;
   creating for each one of said plurality of users a personal entertainment guide for at least one internet video content item from said plurality of internet video content items;
   receiving from each one of said plurality of users a user input for enhancing said personal entertainment guide, user input comprises said comprising descriptive user generated metadata to add to a respective said personal entertainment guide for describing respective said at least one internet video content;
   receiving from each one of said plurality of client devices respective said descriptive user generated metadata;
   processing the descriptive user generated metadata from each client device, of said plurality of client devices using a computerized processor, to produce
   an index for said plurality of internet video content items;
   receiving a query from an additional user; and
   identifying relevant video content item from said plurality of internet video content items by searching said index for a response to said query;
   wherein said index is a result of collecting said descriptive user generated metadata from each one of said plurality of users.

2. The method as recited in claim 1, wherein said identifying comprises
   forwarding the result to the additional user in response to the query, the result including at least a uniform resource identifier relating to at least some of said plurality of internet video content items.

3. The method as recited in claim 1, wherein the plurality of users and the additional user are distinct.

4. The method as recited in claim 1, wherein the personal entertainment guide includes a menu hierarchy used in navigating the at least one internet video content item from said plurality of internet video content items on the first device.

5. The method as recited in claim 2, further comprising:
   receiving additional metadata relating to the relevant internet video content item from the additional user; and
   updating the index based on the additional metadata.

6. The method as recited in claim 1, wherein:
   the descriptive user generated metadata is received from an additional device including a keyboard interface; and
   the method further comprises forwarding the at least one internet video content item to the first device, wherein the first device does not include a keyboard interface.

7. The method as recited in claim 6, wherein the first device is a television and the forwarding the at least one internet video content item to the first device includes converting a format of the internet video content.

8. The method as recited in claim 1, wherein the descriptive user generated metadata includes a uniform resource identifier.

9. The method as recited in claim 8, wherein the descriptive user generated metadata includes a user identification, title, description, source, and at least one tag.

10. The method as recited in claim 1, further comprising:
    generating additional metadata relating to the internet video content item based on descriptive user generated metadata embedded within the at least one internet video content; and
    the generating the index includes generating the index using the additional metadata.

11. The method as recited in claim 1, further comprising generating a library of the internet video content items including the personal entertainment guide.

12. The method as recited in claim 1, further comprising:
    receiving a user ID; and
    generating user metadata corresponding to the user ID.

13. The method as recited in claim 12, wherein the user metadata includes information indicating whether the descriptive user generated metadata relating to the internet video content included explicit or spam fields.

14. The method as recited in claim 2, wherein the forwarding the result includes forwarding a plurality of results and the method further comprises ranking the plurality of results.

15. The method as recited in claim 14, wherein the ranking is based on:
    a number of users that have the at least one internet video content in their library, a number of times the internet video content is played by users, a source of the internet video content, and a rating given by users.

16. The method as recited in claim 1, wherein the internet video content includes a universal resource identifier (URI) disposed in a web page.

17. The method of claim 1, wherein said identifying is performed by crawling said network.

18. The method of claim 1, wherein said identifying comprises identifying at least some of said plurality of internet video content items by at least some of said plurality of users.

19. A system for enabling search of content, the system comprising:
    a crawler which crawls the internet to identify information for a plurality of internet video content items;
    a plurality of applications each effective to receive said information, to present said information to one of a plurality of users and to allow each one of a plurality of users to provide descriptive user generated metadata relating to said internet video content, and to generate, for each one of a plurality of users, a personal entertainment guide facilitating navigation of one of a plurality of users using the respective descriptive user generated metadata;
    a metadata analyzer having a computerized processor and effective to receive and process the descriptive user generated metadata from each said application, using said computerized processor, to produce processed descriptive user generated metadata; and
    an index server connected to the metadata analyzer, the index server effective to receive the processed descriptive user generated metadata relating to each one of said plurality of users from the metadata analyzer and to generate an index for the plurality of internet video content items based on the processed descriptive user generated metadata relating to each one of said plurality of users;
    wherein said index is a result of collecting said descriptive user generated metadata from each one of said plurality of users;
    wherein said index is searched for a response to a query received from an additional user, said response includes a relevant video content item from said plurality of internet video content items.

20. The system as recited in claim 19, wherein the result is forwarded to the additional user in response to the query, the result including at least a uniform resource identifier relating to at least some of internet video content.

21. The system as recited in claim 19, wherein the user and the additional user are distinct.

22. The system as recited in claim 19, wherein the personal entertainment guide includes a menu hierarchy used in navigating the internet video content.

23. The system as recited in claim 20, wherein:
the metadata analyzer is further effective to receive additional metadata relating to the relevant internet video content item from the additional user; and
the index server is further effective to update the index based on the additional metadata.

24. The system as recited in claim 19, wherein:
each said application is installed in a device having a keyboard interface; and
the system further comprises a media server effective to forward at least one of the internet video content items to an additional device, wherein the additional device does not include a keyboard interface.

25. The system as recited in claim 24, wherein the additional device is a television and the media server is effective to convert a format of the internet video content.

26. The system as recited in claim 19, wherein the descriptive user generated metadata includes a uniform resource identifier.

27. The system as recited in claim 26, wherein the descriptive user generated metadata includes a user identification, title, description, source, and at least one tag.

28. The system as recited in claim 19, wherein:
the metadata analyzer further generates additional metadata relating to the relevant internet video content based on descriptive user generated metadata embedded within the relevant internet video content; and
the index server generates the index using the additional metadata.

29. The system as recited in claim 19, further comprising a library including the personal entertainment guide and connected to a client device.

30. The system as recited in claim 19, wherein the metadata analyzer further receives a user ID, and generates user metadata corresponding to the user ID.

31. The system as recited in claim 30, wherein the user metadata includes information indicating whether the descriptive user generated metadata relating to at least one of the plurality of internet video content items includes explicit or spam fields.

32. The system as recited in claim 19, wherein the result includes a plurality of results and the index server ranks the plurality of results.

33. The system as recited in claim 32, wherein the ranking of each internet video content item is based on:
a number of users that have the respective internet video content item in their library, a number of times the respective internet video content item is played by users, a source of the internet video content, and a rating given by users.

34. The system as recited in claim 19, wherein the application is disposed on the device.

35. The system as recited in claim 19, wherein the internet video content includes a universal resource identifier (URI) disposed in a web page.

* * * * *